United States Patent [19]

Edlund

[11] Patent Number: 5,070,618

[45] Date of Patent: Dec. 10, 1991

[54] TENSION DEVICE FOR A CHAIN IN A CHAIN SAW

[75] Inventor: Dag H. Edlund, Huskvarna, Sweden

[73] Assignee: Aktiebolaget Electrolux, Stockholm, Sweden

[21] Appl. No.: 640,065

[22] Filed: Jan. 11, 1991

[30] Foreign Application Priority Data

Mar. 28, 1990 [SE] Sweden ........ 9001120

[51] Int. Cl.[5] ........ B23D 57/02; B26D 1/48

[52] U.S. Cl. ........ 30/386; 30/385; 83/816

[58] Field of Search ........ 30/383, 385, 386; 83/816

[56] References Cited

U.S. PATENT DOCUMENTS 4,920,650 5/1990 Edlund ........ 30/386
4,939,842 7/1990 Rebhan ........ 30/386
4,999,918 3/1991 Schliemann et al. ........ 30/386

*Primary Examiner*—Douglas D. Watts
*Assistant Examiner*—Paul M. Heyrana, Sr.
*Attorney, Agent, or Firm*—Pearne, Gordon, McCoy & Granger

[57] ABSTRACT

When moving the guide bar on a chain saw in order to adjust the chain tension, the following procedure is applied. Through the guide bar runs a shaft (19) having a slot for a screw driver as well as a shape of a cog-wheel (18) on the inside of the guide bar. The hole in the guide bar is the ordinary hole for a tension pin. The cover (11) above the clutch also keeps the guide bar in place and has an oval opening (23) providing accessibility to the above shaft in all its positions. Inside the guide bar, in the saw body, there is a suitable oblong cavity (16) to make room for the cog-wheel part of the shaft. That cavity has on its lower edge the form of a straight toothed section (17) adapted to the cog-wheel part.

5 Claims, 2 Drawing Sheets

TENSION DEVICE FOR A CHAIN IN A CHAIN SAW

BACKGROUND AND SUMMARY

The present invention relates to an arrangement for setting the position of a guide bar on a chain saw relatively to the saw body.

The guide bar attachment on a chain saw is generally so designed that the guide bar can be displaced in its longitudinal direction within a limited setting area before the position is locked by means of guide bar bolts. In the Swedish Patent Specification SE-P-7401345.9 there is described a means for displacing the guide bar forwards and in that way effect a stretching of the saw chain on the guide bar. The arrangement thus known comprises a rack attached to the guide bar. Moreover, it comprises a tooth wheel projecting on the outside of the guide bar attachment and being in engagement with the rack. It is also rotatably mounted on one of the guide bar bolts. The arrangement is principally located in the cover above the guide bar attachment and shall thus be fitted against the guide bar mounted on the bolts. The application of the cover is therefore by many saw operators considered unnecessarily troublesome and time wasting as it involves a careful adaptation of several parts. It is therefore considered important to redesign the arrangement so that its components are located in a saw body. In doing so, the arrangement and the guide bar form a unity when the cover is to be put on.

The solution of the problem presented by the present invention is based on the principle to move the guide bar in its attachment by means of a cog-wheel and a straight toothed section. Such a principle offers in this case a simpler construction and a better location compared with that of the prior art. Other advantages of it are good accessibility in respect of the adjustment unit, rapid displacement of the guide bar without any prepositioning of the same when it is fitted. Those advantages are obtained when the arrangement is made according to the characteristics of claim 1.

BRIEF DESCRIPTION OF THE DRAWING

An embodiment of the invention is described in the following with reference to the attached drawings showing in FIG. 1 the guide bar side of a chain saw, FIG. 2 the guide bar attachment in the chain saw body arranged according to the invention, with the cover removed, FIG. 3 a horizontal section along the line III—III in FIG. 1 of the guide bar attachment and the arrangement.

DESCRIPTION OF THE PREFERRED EMBODIMENTS

Figure 1:
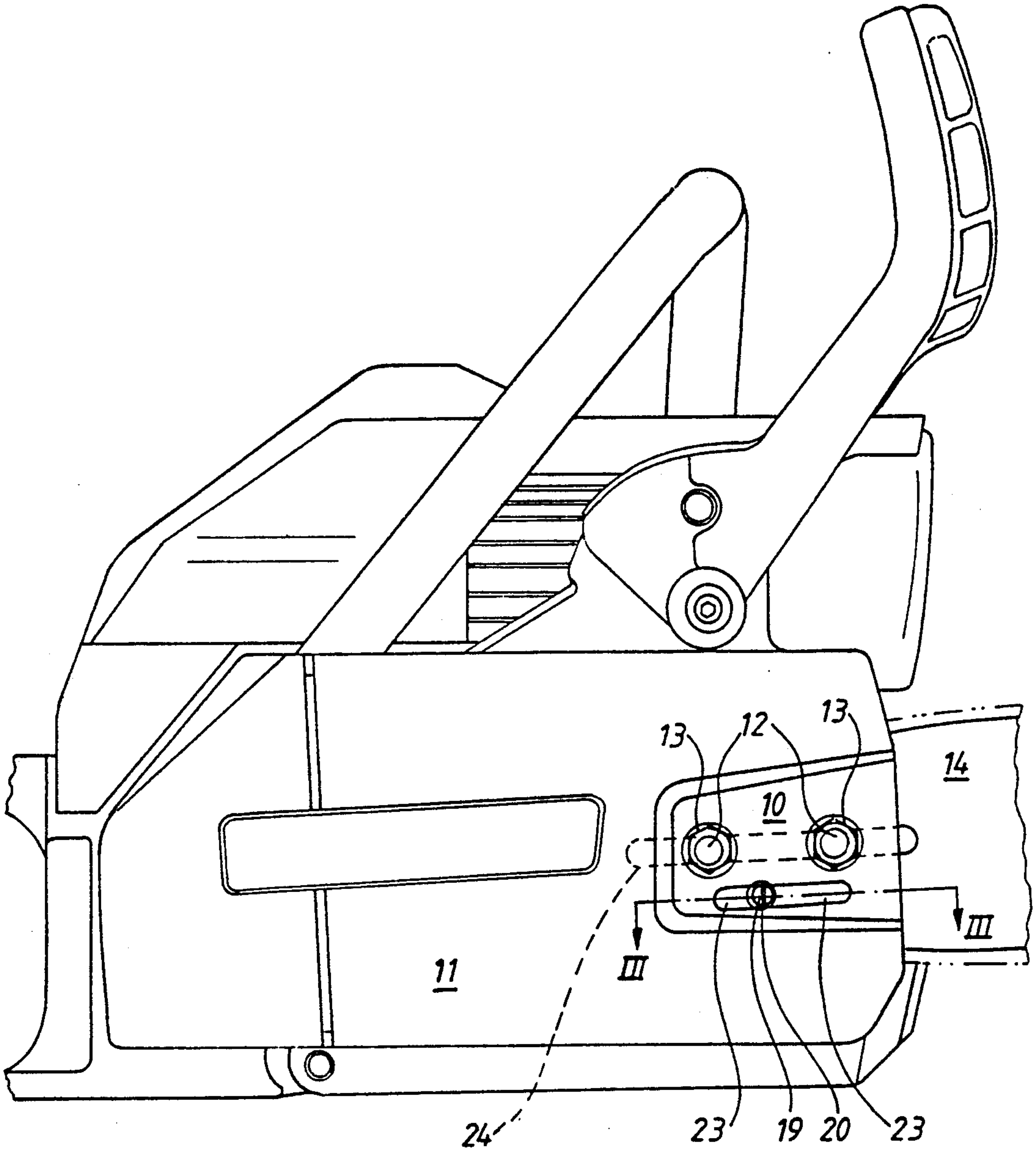

A guide bar attachment 10 is located on the right side of the saw body and is covered by a cover 11 kept in place by two guide bar bolts 12 with nuts 13. The inner end of a guide bar 14 is in its fitted position secured between the cover and a guide bar plate 15 on the side of the saw body. Under the two bolts 12 on that side there is a long narrow groove 16 carried out when the saw body was manufactured. The lower long side of the groove has the shape of a toothed section 17, while the upper long side is flat. Between the long sides there is a space for a cog-wheel 18 provided with a shaft 19 having a screw driver slot 20. If the wheel is rotated in the groove, it can be moved thanks to the teeth between the two ends of the groove.

Figure 2:
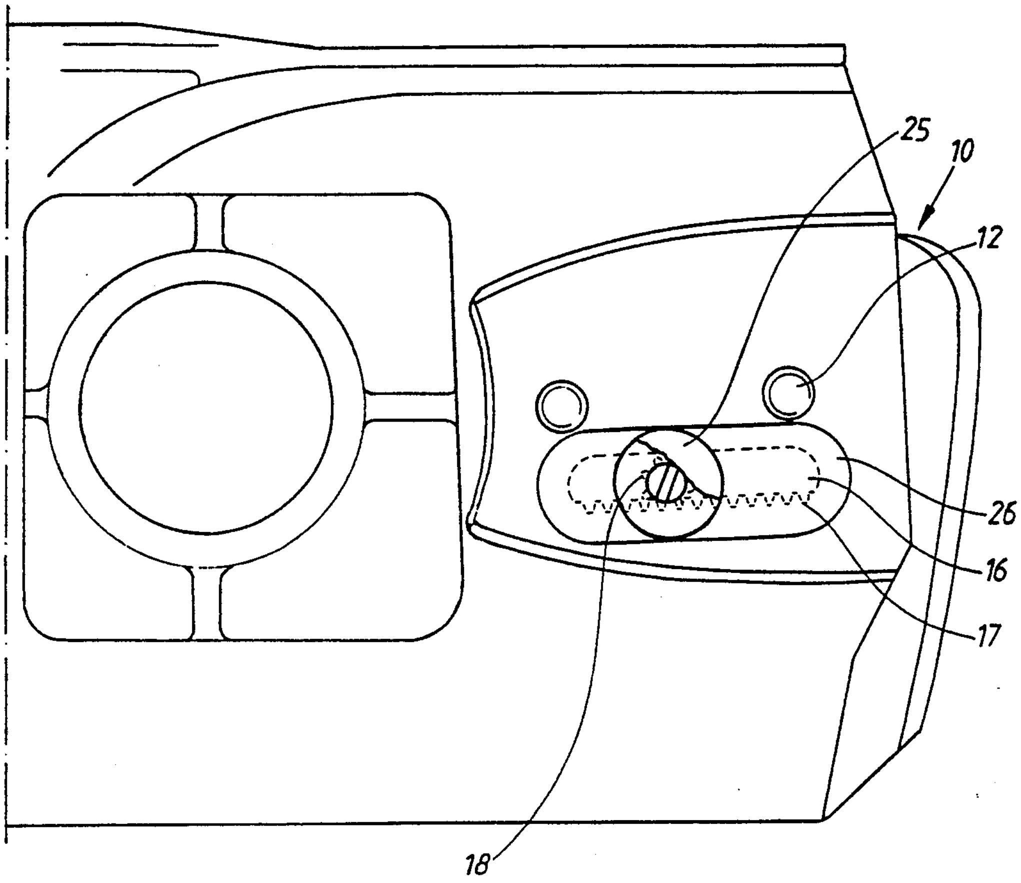
Figure 3:
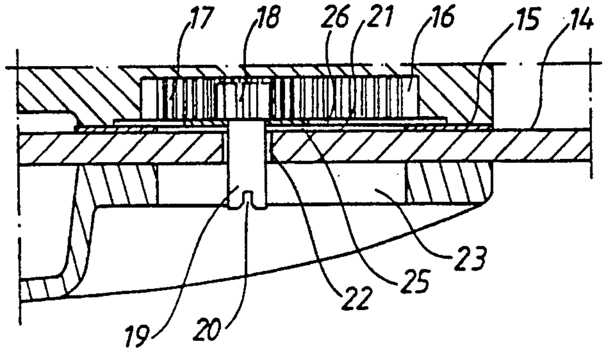

The shaft 19 passes through an elongated groove 21 in the guide bar plate 15 and also through a round hole 22 in the guide bar as well as through an elongated hole 23 in the cover 11. The end of the shaft with the screw driver slot 20 can thus be reached with a screw driver on the outside of the cover. When rotating the shaft with the screw driver, the shaft is moved between the ends of the grooves 21 and 23. The hole 22 surrounds the shaft which thus drives the guide bar when being moved. The guide bar has an oblong hole 24 around the bolts 12 and is, when setting the chain tension by means of the shaft and the screw driver, loosely supported in the guide bar attachment and follows consequently the movement of the shaft as long as that one is turned by the screw driver. After the setting, the guide bar is fastened by means of the guide bar bolts. As a brake against a possible self-rotation during the setting and for maintaining the setting, the shaft has been provided with a cup spring 24 located between the cog-wheel and the guide bar plate. When tightening the nuts 13, the cup spring is compressed and locks in this way the cog-wheel (and the guide bar) in the set position. As disclosed in FIG. 2, the cup spring is placed in an elongated countersink 26 around the groove 16 in the saw body. As the periphery of the cup spring presses against the top edge of the countersink, the cog-wheel ist constantly kept in good contact with the toothed section.

I claim:

1. A chain saw with a chain tension arrangement on said chain saw body comprising a guide bar attachment in which the said guide bar is movably fitted in its longitudinal direction by means of a tooth section (17) arranged in said chain saw body, a cog-wheel (18) for said section firmly united with a shaft (19) passing through a fitting hole (22) in the guide bar and through a long narrow hole (23) on the outside of the guide bar attachment, which hole is directed along the toothed section, said shaft provided with an outer end fitting to a screw tool.

2. Arrangement according to claim 1, wherein a plate (15) between the guide bar and the saw body, being provided with a long narrow hole (21) for the shaft, constitutes a holding device as far as the cog-wheel of the toothed section is concerned.

3. Arrangement according to claim 2, wherein a cup spring (25) on the shaft between the cog-wheel and said plate (15) constitutes an obstacle against self-turning of the shaft.

4. Arrangement according to claim 3, wherein the toothed section constitutes one of the long sides of an elongated groove (16) in the guide bar direction of the saw body and that the width of the groove is equal to the diameter of the cog-wheel.

5. Arrangement according to claim 4, wherein the elongated groove is surrounded on all sides of a countersink (26), the width of which is at least the same as the diameter of the cup spring (25).

* * * * *